United States Patent
Li et al.

(10) Patent No.: US 9,336,775 B2
(45) Date of Patent: May 10, 2016

(54) POSTERIOR-BASED FEATURE WITH PARTIAL DISTANCE ELIMINATION FOR SPEECH RECOGNITION

(71) Applicant: Microsoft Corporation, Redmond, WA (US)

(72) Inventors: Jinyu Li, Redmond, WA (US); Zhijie Yan, Beijing (CN); Qiang Huo, Beijing (CN); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 347 days.

(21) Appl. No.: 13/785,168

(22) Filed: Mar. 5, 2013

(65) Prior Publication Data
US 2014/0257814 A1    Sep. 11, 2014

(51) Int. Cl.
| | |
|---|---|
| G10L 15/28 | (2013.01) |
| G10L 15/14 | (2006.01) |
| G10L 15/00 | (2013.01) |
| G10L 15/10 | (2006.01) |

(52) U.S. Cl.
CPC .............. *G10L 15/14* (2013.01); *G10L 15/10* (2013.01)

(58) Field of Classification Search
None
See application file for complete search history.

(56) References Cited

U.S. PATENT DOCUMENTS

| | | | |
|---|---|---|---|
| 5,638,487 A * | 6/1997 | Chigier | G10L 15/04 704/202 |
| 6,029,124 A * | 2/2000 | Gillick et al. | 704/200 |
| 6,374,222 B1 * | 4/2002 | Kao | G10L 15/08 704/241 |
| 6,697,778 B1 | 2/2004 | Kuhn et al. | |
| 6,725,195 B2 * | 4/2004 | Sankar et al. | 704/240 |
| 7,363,222 B2 * | 4/2008 | Josenhans | 704/231 |
| 7,672,836 B2 * | 3/2010 | Lee | G10L 25/90 704/207 |
| 7,774,203 B2 * | 8/2010 | Wang et al. | 704/254 |
| 8,401,844 B2 * | 3/2013 | Arakawa et al. | 704/225 |
| 2011/0251843 A1 | 10/2011 | Aronowitz | |
| 2012/0330664 A1 | 12/2012 | Lei et al. | |

OTHER PUBLICATIONS

Bouselmi, et al., "Extended Partial Distance Elimination and Dynamic Gaussian Selection for Fast Likelihood Computation", In Ninth Annual Conference of the International Speech Communication Association, Sep. 22, 2008, 4 pages.

Yang, et al., "A Ranking-based Approach to Word Reordering for Statistical Machine Translation", In Proceedings of the 50th Annual Meeting of the Association for Computational Linguistics, Jul. 8, 2012, 9 pages.

(Continued)

*Primary Examiner* — Satwant Singh
(74) *Attorney, Agent, or Firm* — Danielle Johnston Holmes; Steven Spellman; Micky Minhas

(57) ABSTRACT

A high-dimensional posterior-based feature with partial distance elimination may be utilized for speech recognition. The log likelihood values of a large number of Gaussians are needed to generate the high-dimensional posterior feature. Gaussians with very small log likelihoods are associated with zero posterior values. Log likelihoods for Gaussians for a speech frame may be evaluated with a partial distance elimination method. If the partial distance of a Gaussian is already too small, the Gaussian will have a zero posterior value. The partial distance may be calculated by sequentially adding individual dimensions in a group of dimensions. The partial distance elimination occurs when less than all of the dimensions in the group are sequentially added.

20 Claims, 6 Drawing Sheets

(56) References Cited

OTHER PUBLICATIONS

Liu, et al., "Investigating Data Selection for Minimum Phone Error Training of Acoustic Models", In IEEE International Conference on Multimedia and Expo, Jul. 2, 2007, 4 pages.
Pellom, et al., "Fast Likelihood Computation Techniques in Nearest-Neighbor Based Search for Continuous Speech Recognition", In IEEE Signal Processing Letters, vol. 8, Issue 8, Aug. 2001, 4 pages.
Zheng, et al., "fMPE-MAP: Improved Discriminative Adaptation for Modeling New Domains", In 8th Annual Conference of the International Speech Communication Association, Aug. 27, 2007, 4 pages.
Povey, et al., "FMPE: Discriminatively Trained Features for Speech Recognition", In IEEE International Conference on Acoustics, Speech and Signal Processing, Mar. 18, 2005, 4 pages.
Aradilla, et al., "Posterior Features Applied to Speech Recognition Tasks with User-Defined Vocabulary", In IEEE International Conference on Acoustics, Speech and Signal Processing, Apr. 19, 2009, 4 pages.
PCT International Search Report and Written Opinion in International Application PCT/US2014/019147, mailed May 16, 2014, 10 pgs.
Wu, K-S et al., "Fast VQ Envoding by an Efficient Kick-Out Condition", IEEE Transactions on Circuits and Systems for Video Technology. IEEE Service Center, Piscataway, NJ, US, vol. 10, No. 1, Feb. 2000, pp. 59-62.

\* cited by examiner

POSTERIOR-BASED FEATURE WITH PARTIAL DISTANCE ELIMINATION FOR SPEECH RECOGNITION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many computer software applications perform automatic speech recognition ("ASR") in association with various voice-activated functions. These voice-activated functions may include voice search, short message dictation, voice dialing, call routing, home automation, data entry, speech-to-text processing, and the processing of information queries which may be initiated from any number of devices such as desktop and laptop computers, tablets, smartphones, gaming devices, and automotive computer systems. Various acoustical models are utilized in ASR software to accurately recognize the human voice by minimizing recognition errors. For example, many acoustical models utilize feature minimum phone error rate ("fMPE"), for minimizing recognition errors in speech recognition. Typically, the use of fMPE requires the use of a posterior-based acoustical feature which is characterized by a super vector consisting of the evaluation of posteriors (i.e., the probabilities) to determine where particular speech input frames are located in an acoustic sub-space. However, the evaluation of posteriors may require hundreds of thousands or even millions of Gaussian likelihood evaluations. As a result of the large number of required computations (i.e., high computational costs), the speech recognition process is slowed considerably. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for utilizing a posterior-based feature with partial distance elimination for speech recognition. An utterance including multiple speech frames may be received by a computer. Log likelihoods for Gaussians for a speech frame may be evaluated to calculate a partial distance. The partial distance may be calculated by sequentially adding individual dimensions in a group of dimensions. The partial distance elimination occurs when less than all of the dimensions in the group are sequentially added.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for utilizing a posterior-based feature with partial distance elimination for speech recognition. An utterance including multiple speech frames may be received by a computer. Log likelihoods for Gaussians for a speech frame may be evaluated to calculate a partial distance. The partial distance may be calculated by sequentially adding individual dimensions in a group of dimensions. The partial distance elimination occurs when less than all of the dimensions in the group are sequentially added.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
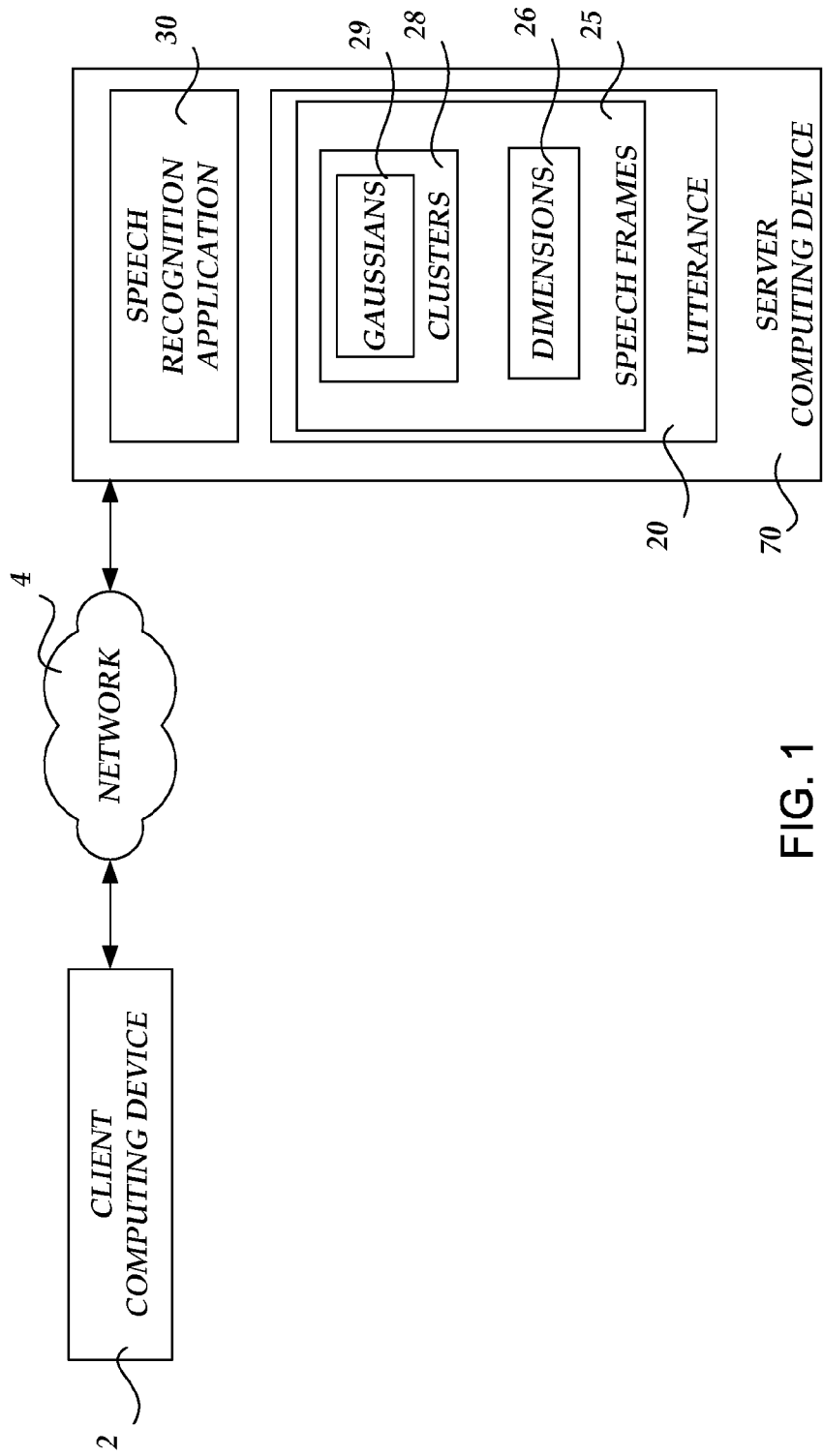
FIG. 1 is a block diagram illustrating a network architecture for utilizing a posterior-based feature with partial distance elimination for speech recognition, in accordance with various embodiments.

Referring now to the drawings, in which like numerals represent like elements through the several figures, various aspects of the present invention will be described. FIG. 1 is a block diagram illustrating a network architecture for utilizing a posterior-based feature with partial distance elimination for speech recognition, in accordance with various embodiments. The network architecture includes a client computing device 2 in communication with a server computing device 70 over a network 4. The server computing device 70 may include an utterance 20 and a speech recognition application 30. In accordance with an embodiment, the utterance 20, which may be received from a user of the client computing device 2, may comprise of a number of requests for which speech recognition is utilized including, but not limited to, short message service ("SMS") dictation, voice dialing, call routing, home automation, data entry, speech-to-text processing, and information query processing. In accordance with an embodiment, the client computing device 2 may comprise a computer capable of executing one or more application programs including, but not limited to, a desktop computer, a laptop computer, a tablet computer, a "smartphone" (i.e., a mobile phone having computer functionality and/or which is capable of running operating system software to provide a standardized interface and platform for application developers), a gaming computing device, and an automobile-based computer. The client computing device 2 may communicate with the server computing device 70 over the network 4 which may include a local network or a wide area network (e.g., the Internet). In accordance with an embodiment, the server computing device 70 may comprise one or more computing devices for receiving the utterance 20 from the client computing device 2 and for sending an appropriate response thereto (e.g., the server computing device 70 may be configured to send results data in response to a query received in an utterance from the client computing device 2). The server computing device 70 may also comprise a computer capable of executing one or more application programs including the speech recognition application 30.

The utterance 20 may comprise a number of speech frames 25, where each speech frame represents a portion of speech in the utterance 20. Each of the speech frames 25 may include a number of dimensions 26 and clusters 28. As should be understood by those skilled in the art, a speech frame may include a number of acoustical vectors and each acoustical vector has a number of dimensions (i.e., dimensional values). Each of the clusters 28 may comprise a set of Gaussians 29. Gaussians are well known in the art of speech recognition and thus will not be discussed in detail herein.

In accordance with an embodiment, the speech recognition application 30 may comprise a software application which utilizes automatic speech recognition ("ASR") to perform a number of functions which may include, but are not limited to, search engine functionality (e.g., business search, stock quote search, sports scores, movie times, weather data, horoscopes, document search), navigation, voice activated dialing ("VAD"), automobile-based functions (e.g., navigation, turning a radio on or off, activating a cruise control function, temperature control, controlling video display functions, and music and video playback), device control functions (e.g., turning the client computing device 2 off, recording note, deleting/creating/moving files), and messaging (e.g., text and MMS), and media functions (e.g., taking a picture). In accordance with various embodiments, the speech recognition application 30 may configured to utilize posterior-based feature with partial distance elimination for speech recognition. In accordance with an embodiment, and as should be appreciated by those skilled in the art of speech recognition, techniques such as feature minimum phone error rate ("fMPE") utilize a high-dimensional posterior-based feature to determine in which part of an acoustic space incoming speech is located. A posterior-based feature is a super vector consisting of posteriors (i.e., probabilities indicating the location of a particular speech input frame in the acoustic space) evaluated from hundreds of thousands, or even millions, of Gaussians. The utilization of the posterior-based feature with partial distance elimination by the speech recognition application 30 will be described in greater detail below with respect to FIGS. 2-4.

Figure 2:
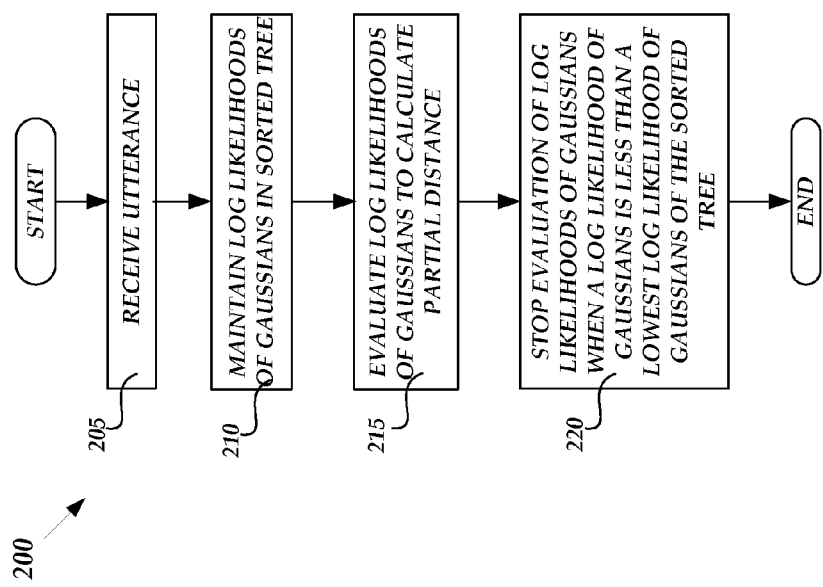
FIG. 2 is a flow diagram illustrating a routine for utilizing a posterior-based feature with partial distance elimination for speech recognition, in accordance with an embodiment.

FIG. 2 is a flow diagram illustrating a routine 200 for utilizing a posterior-based feature with partial distance elimination for speech recognition, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 2-4 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 200 begins at operation 205, where the speech recognition application 30, executing on the server computing device 70, receives the utterance 20 from a user of the client computing device 2. The utterance may include multiple speech frames. For example, a user of the client computing device 2 may deliver the utterance 20 into a microphone of the client computing device 2, for delivery to the server computing device 70, in order to initiate a search query.

From operation 205, the routine 200 continues to operation 210, where the speech recognition application 30, executing on the server computing device 70, may maintain log likelihoods of Guassians, which are utilized in calculating partial distances for Gaussians, in a sorted tree. As defined herein, a "log likelihood" is the natural logarithm of a function of the parameters of a statistical model (i.e., the likelihood of a set of parameter values given some observed outcomes is equal to the probability of those observed outcomes given those parameter values).

From operation 210, the routine 200 continues to operation 215, where the speech recognition application 30, executing on the server computing device 70, may evaluate log likelihoods of Gaussians for a speech frame to calculate a partial distance.

In particular, the speech recognition application 30 may evaluate the log likelihoods of Gaussians for a speech frame to calculate the partial distance by sequentially adding the dimensions (i.e., one dimension at a time). In accordance with an embodiment, the evaluation of log likelihoods of Gaussians may be performed using the following function:

$$d^I(o_t \mid s_m) = C_m - \sum_{i=1}^{I} \frac{(o_t(i) - \mu_m(i))^2}{2\sigma_m^2(i)}, \ 1 \leq I \leq D$$

In the above function, $d^I(o_t|s_m)$ represents a log likelihood for a Gaussian, $o_t$ is the feature vector (i.e., an acoustical feature) of time t, D is a total number of dimensions, $s_m$ stands for the m-th Gaussian, $\mu_m$ is the mean vector of a Gaussian, $\sigma_m^2$ represents a diagonal covariance, $C_m$ is a Gaussian constant, i is a dimension index, and I stands for a number of dimensions between 1 and D (i.e., the total number of dimensions). It should be understood that the aforementioned function directly uses partial distance elimination by evaluating the log likelihoods of Gaussians while keeping them in a sorted tree. When evaluating a new Gaussian, the partial distance is calculated by sequentially adding one dimension each time.

From operation 215, the routine 200 continues to operation 220, where the speech recognition application 30, executing on the server computing device 70, may stop the evaluation of log likelihoods of Gaussians when a log likelihood of Gaussians is less than a lowest log likelihood of Gaussians of the sorted tree. In particular, during the evaluation, if $d^I(o_t|s_m)$ is already lower than the lowest log likelihood of Gaussians of the sorted tree, then the evaluation stops (i.e., no further dimensions are sequentially added) because the current Gaussian under evaluation cannot have a likelihood ranked as a top N Gaussians. In this manner, it should be appreciated that partial distance elimination occurs because less than all of the plurality of dimensions are sequentially added. It should be understood that a "top N Gaussians" represents a subset of Gaussians with large posterior values from among a larger set of Gaussians. For example, for a set of Gaussians, the first 100 dimensional values may be designated as the "top N." If none of the log likelihoods of Gaussians evaluated is less than a lowest log likelihood of Gaussians of the sorted tree, then all of the dimensions are sequentially added during the evaluation (i.e., no partial distance elimination occurs). From operation 220, the routine 200 then ends.

Figure 3:
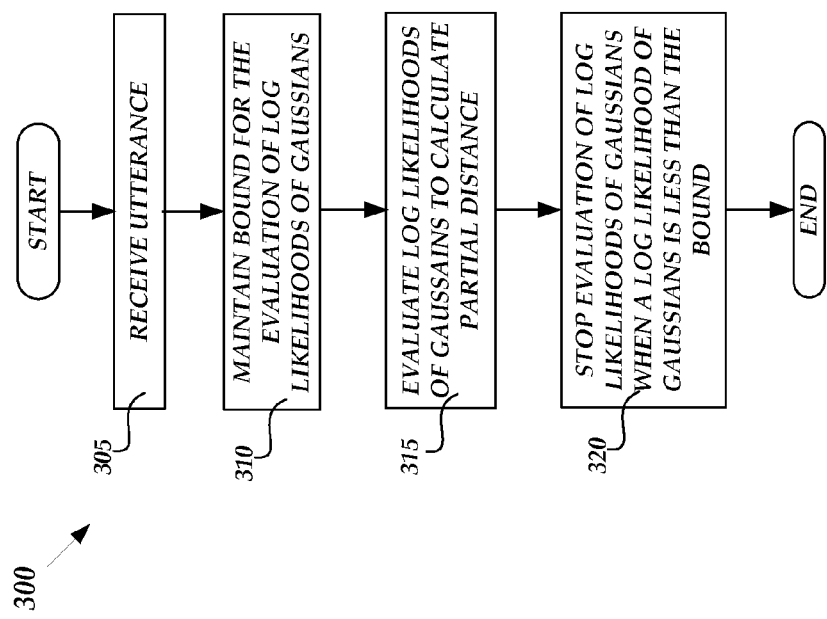
FIG. 3 is a flow diagram illustrating a routine for utilizing a posterior-based feature with partial distance elimination for speech recognition, in accordance with another embodiment.

FIG. 3 is a flow diagram illustrating a routine 300 for utilizing a posterior-based feature with partial distance elimination for speech recognition, in accordance with another embodiment. The routine 300 begins at operation 305, where the speech recognition application 30, executing on the server computing device 70, receives the utterance 20 from a user of the client computing device 2. The utterance may include multiple speech frames. For example, a user of the client computing device 2 may deliver the utterance 20 into a microphone of the client computing device 2, for delivery to the server computing device 70, in order to initiate a search query.

From operation 305, the routine 300 continues to operation 310, where the speech recognition application 30, executing on the server computing device 70, may maintain a bound for the evaluation of log likelihoods of Gaussians. The bound may be determined by subtracting the log likelihoods of Gaussians by a positive number corresponding to a pre-defined threshold value.

From operation 310, the routine 300 continues to operation 315, where the speech recognition application 30, executing on the server computing device 70, may evaluate the log likelihoods of Gaussians to calculate a partial distance. In particular, the speech recognition application 30 may utilize the same function described at operation 215 of FIG. 2 for the evaluation of the log likelihoods of Gaussians:

$$d^I(o_t \mid s_m) = C_m - \sum_{i=1}^{I} \frac{(o_t(i) - \mu_m(i))^2}{2\sigma_m^2(i)}, 1 \leq I \leq D$$

It should be understood that in evaluating the log likelihoods of Gaussians, the evaluation of the log likelihoods in Gaussians is first performed to determine an initial log likelihood of Gaussians. It should be understood that this initial log likelihood of Gaussians also serves as the largest log likelihood of Gaussians evaluated thus far. After the determination of the initial log likelihood of Gaussians, the evaluation continues (utilizing the above function) for every incoming Gaussian.

From operation 315, the routine 300 continues to operation 320, where the speech recognition application 30, executing on the server computing device 70, may stop the evaluation of log likelihoods of Gaussians when a log likelihood of Gaussians is less than the bound determined at operation 310. In particular, during the evaluation, if $d^I(o_t \mid s_m)$ is already less than the bound, then the evaluation stops (i.e., no further dimensions are sequentially added). In this manner, it should be appreciated that partial distance elimination occurs because less than all of the plurality of dimensions are sequentially added. It should be appreciated that, in contrast to the routine 200 of FIG. 2 (discussed above), the routine 300 may avoid relative large costs whenever a Gaussian is inserted because there is no need to maintain a sorted tree. If, on the other hand, the final log likelihood of Gaussians evaluated is greater than the largest log likelihood of Gaussians, the largest log likelihood of Gaussians is refreshed, the bound is updated accordingly, and all of the dimensions are sequentially added during the evaluation (i.e., no partial distance elimination occurs). From operation 320, the routine 300 then ends.

Figure 4:
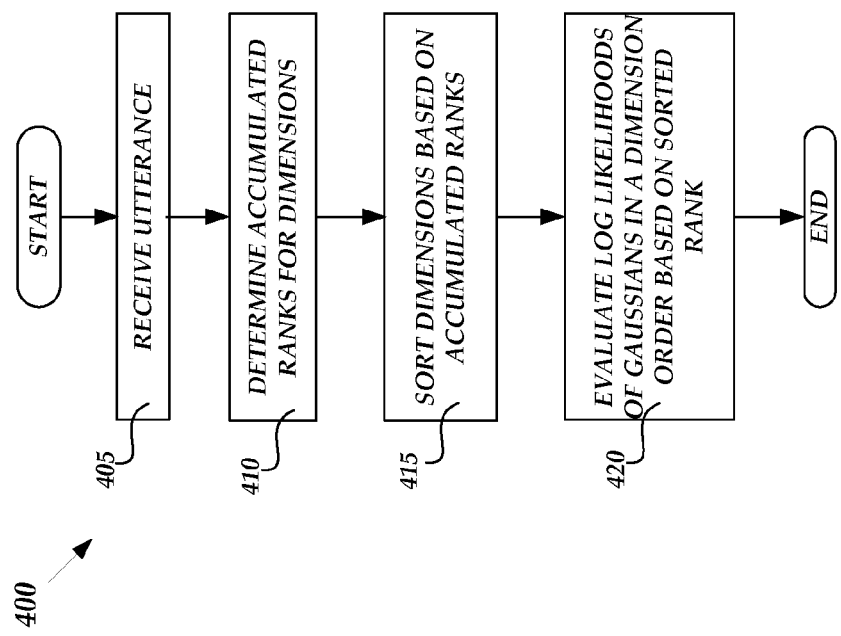
FIG. 4 is a flow diagram illustrating a routine for utilizing a posterior-based feature with partial distance elimination for speech recognition, in accordance with another embodiment.

FIG. 4 is a flow diagram illustrating a routine 400 for utilizing a posterior-based feature with partial distance elimination for speech recognition, in accordance with another embodiment. The routine 400 begins at operation 405, where the speech recognition application 30, executing on the server computing device 70, receives the utterance 20 from a user of the client computing device 2. The utterance may include multiple speech frames. For example, a user of the client computing device 2 may deliver the utterance 20 into a microphone of the client computing device 2, for delivery to the server computing device 70, in order to initiate a search query.

From operation 405, the routine 400 continues to operation 410, where the speech recognition application 30, executing on the server computing device 70, may determine accumulated ranks for the dimensions for the acoustical vectors in a speech frame. In accordance with an embodiment, the accumulated ranks may be determined by calculating a distance for every dimension and then ranking them according to calculated distance values. Thus, dimensions having the largest values (i.e., the largest distance values) would be ranked higher than dimensions having lower values.

From operation 410, the routine 400 continues to operation 415, where the speech recognition application 30, executing on the server computing device 70, may sort the dimensions based on the accumulated ranks determined at operation 410. As a result of the sort, the first several dimensions (i.e., the higher ranked dimensions) are more important than the others.

From operation 415, the routine 400 continues to operation 420, where the speech recognition application 30, executing on the server computing device 70, may evaluate the log likelihoods of Gaussians in a dimension order based on the sorted rank. In particular, the log likelihoods of Gaussians may be evaluated based on the sorted accumulated dimensional ranks, to calculate a partial distance. In accordance with an embodiment, the speech recognition application 30 may utilize a similar function described at operation 215 of FIG. 2 for the evaluation of the log likelihoods of Gaussians:

$$d^I(o_t \mid s_m) = C_m - \sum_{i=1}^{I} \frac{(o_t(i) - \mu_m(i))^2}{2\sigma_m^2(i)}, 1 \leq I \leq D,$$

with the exception that that the first several dimensions (i.e., the higher ranked dimensions) are evaluated first. As a result a better computation cost reduction is achieved when compared to the routines 200 and 300, (discussed above with respect to FIGS. 2 and 3) in which the dimensions are not sorted by accumulated rank. From operation 420, the routine 400 then ends.

Figure 5:
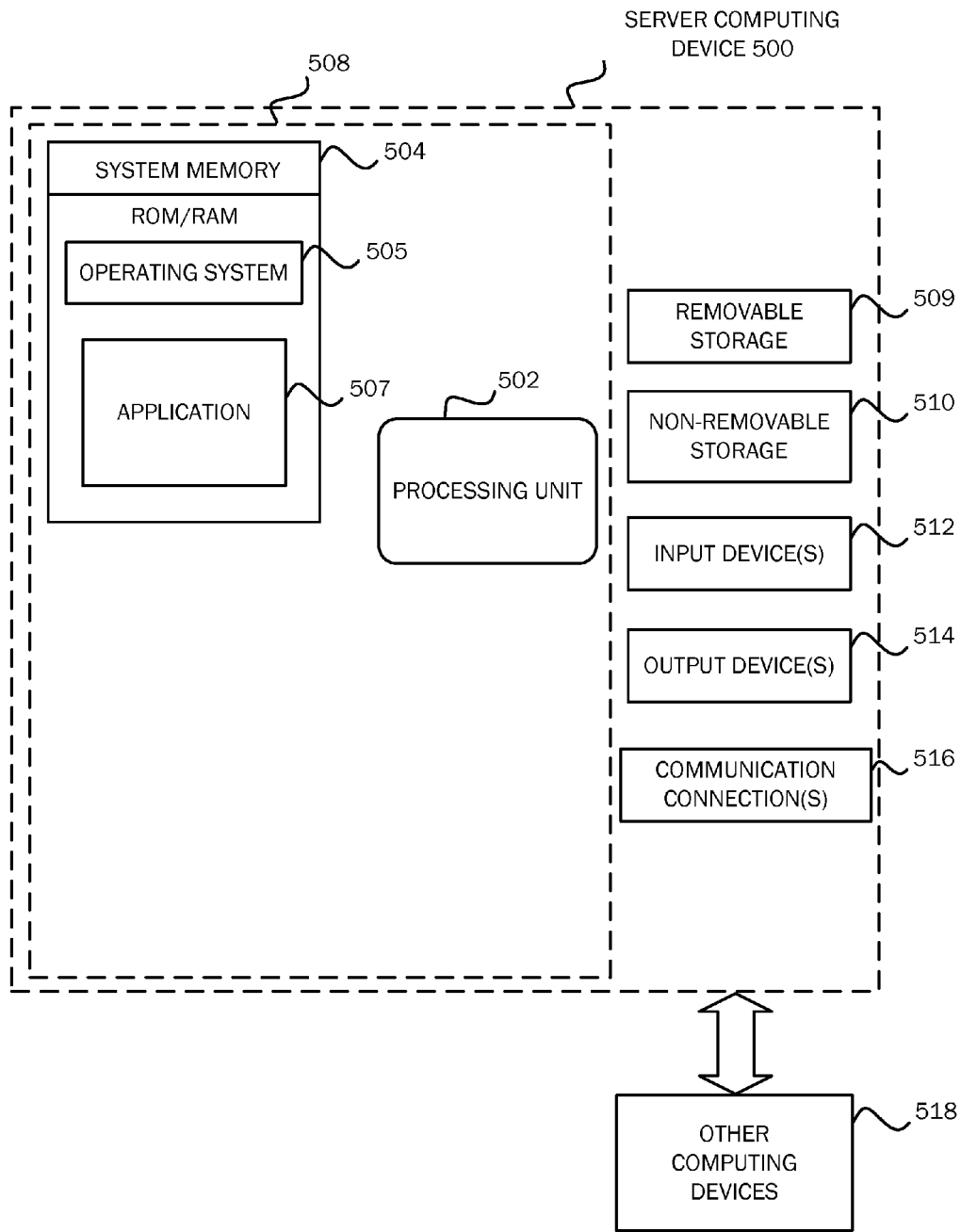
FIG. 5 is a simplified block diagram of a server computing device with which various embodiments may be practiced.

FIG. 5 is a block diagram illustrating example physical components of a server computing device 500 with which various embodiments may be practiced. In a basic configuration, the server computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and application 507. Operating system 505, for example, may be suitable for controlling the server computing device 500's operation and, in accordance with an embodiment, may comprise the WINDOWS operating systems from MICROSOFT CORPORATION of Redmond, Wash. The application 507, for example, may comprise functionality for receiving an utterance and utilizing a posterior-based feature with partial distance elimination for performing speech recognition on the utterance. It should be understood, however, that the embodiments described herein may also be practiced in conjunction with other operating systems and application programs and further, is not limited to any particular application or system.

The server computing device 500 may have additional features or functionality. For example, the server computing device 500 may also include additional data storage devices (removable and/or non-removable) such as, for example, magnetic disks, optical disks, solid state storage devices ("SSD"), flash memory or tape. Such additional storage is illustrated in FIG. 5 by a removable storage 509 and a non-removable storage 510. The computing device 500 may also have input device(s) 512 such as a keyboard, a mouse, a pen, a sound input device (e.g., a microphone), a touch input device for receiving gestures, etc. Output device(s) 514 such as a display, speakers, a printer, etc. may also be included. The aforementioned devices are examples and others may be used.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, automotive computing systems and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 500 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information (such as computer readable instructions, data structures, program modules, or other data) in hardware. The system memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the server computing device 500. Any such computer storage media may be part of the server computing device 500.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
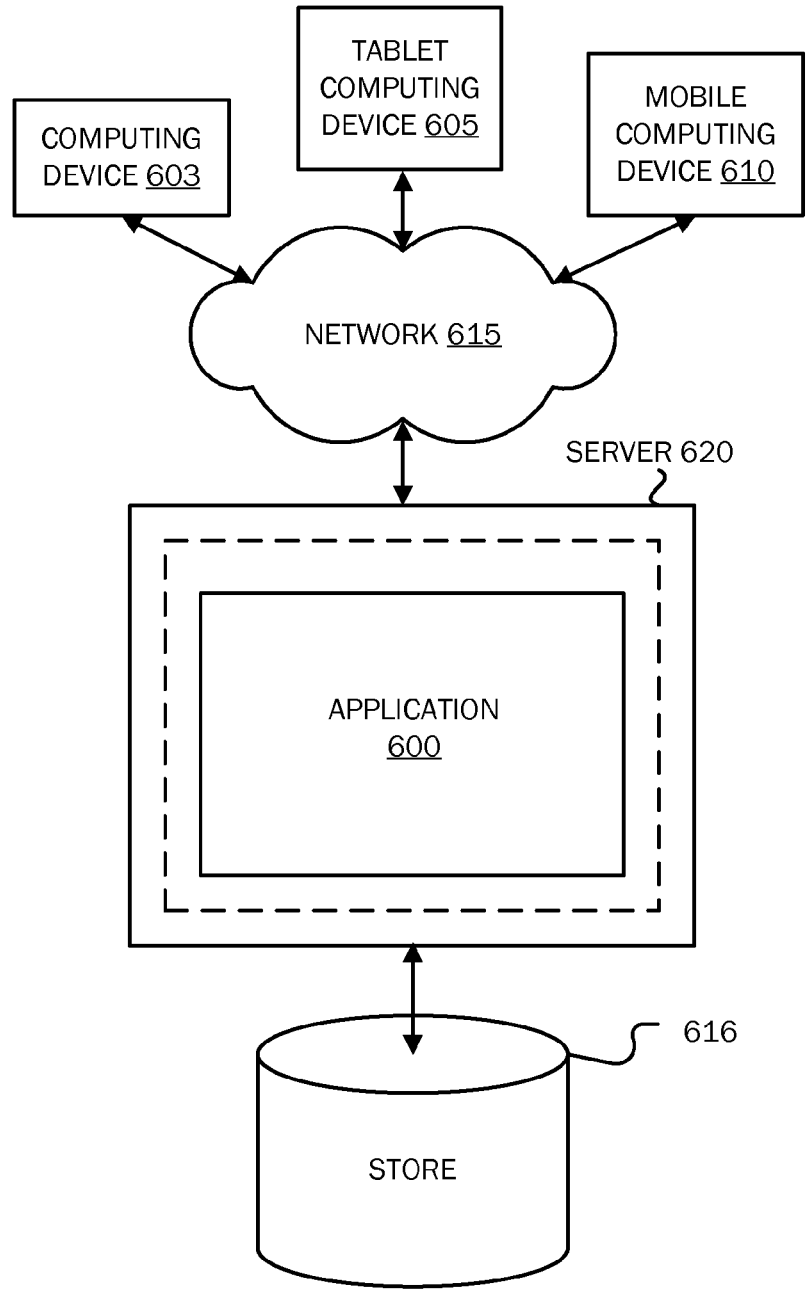
FIG. 6 is a simplified block diagram of a distributed computing system in which various embodiments may be practiced.

FIG. 6 is a simplified block diagram of a distributed computing system in which various embodiments may be practiced. The distributed computing system may include number of client devices such as a computing device 603, a tablet computing device 605 and a mobile computing device 610. The client devices 603, 605 and 610 may be in communication with a distributed computing network 615 (e.g., the Internet). A server 620 is in communication with the client devices 603, 605 and 610 over the network 615. The server 620 may store application 600 which may be perform routines including, for example, utilizing a posterior-based feature with partial distance elimination for performing speech recognition on the utterance, as described above with respect to the operations in routines 200, 300 and 400.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routine's operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A method of utilizing a posterior-based feature with partial distance elimination for speech recognition, comprising:
   receiving, by a computer, an utterance comprising a plurality of speech frames; and
   evaluating, by the computer, a plurality of log likelihoods of Gaussians for a speech frame to calculate a partial distance by sequentially adding a plurality of dimensions, the partial distance elimination occurring when less than all of the plurality of dimensions are sequentially added;
   wherein the evaluating comprises maintaining a bound for the plurality of log likelihoods, the bound being determined by comparing the plurality of log likelihoods of Gaussians to a threshold value.

2. The method of claim 1, wherein evaluating, by the computer, a plurality of log likelihoods of Gaussians for a speech frame to calculate a partial distance by sequentially adding a plurality of dimensions further comprises maintaining the plurality of log likelihoods of Gaussians in a sorted tree.

3. The method of claim 2, further comprising stopping the evaluation of the plurality of log likelihoods of Gaussians when one of the plurality of log likelihoods of Gaussians is less than a lowest log likelihood of Gaussians of the sorted tree.

4. The method of claim 1, wherein evaluating, by the computer, the plurality of log likelihoods of Gaussians for a speech frame to calculate a partial distance by sequentially adding a plurality of dimensions comprises evaluating a plurality of log likelihoods of Gaussians for the speech frame.

5. The method of claim 1, further comprising stopping the evaluation of the plurality of log likelihoods of Gaussians when one of the plurality of log likelihoods of Gaussians is less than the bound.

6. The method of claim 1, further comprising:
   determining accumulated ranks for the plurality of dimensions; and
   sorting the plurality of dimensions based on the accumulated ranks.

7. The method of claim 1, wherein the threshold value is a positive number, and wherein comparing the plurality of log likelihoods of Gaussians comprises subtracting the positive number from the plurality of log likelihoods of Gaussians.

8. An apparatus for utilizing a posterior-based feature with partial distance elimination for speech recognition, comprising:
   a memory for storing executable program code; and
   a processor, functionally coupled to the memory, the processor being responsive to computer-executable instructions contained in the program code and operative to:
      receive an utterance comprising a plurality of speech frames; and
      evaluate a plurality of log likelihoods of Gaussians for a speech frame to calculate a partial distance by sequentially adding a plurality of dimensions, the partial distance elimination occurring when less than all of the plurality of dimensions are sequentially added;
      wherein the evaluating comprises maintaining a bound for the plurality of log likelihoods, the bound being determined by comparing the plurality of log likelihoods of Gaussians to a threshold value.

9. The apparatus of claim 8, wherein the processor, in evaluating a plurality of log likelihoods Gaussians for a speech frame to calculate a partial distance by sequentially adding a plurality of dimensions, is further operative to maintain the plurality of log likelihoods of Gaussians in a sorted tree.

10. The apparatus of claim 9, wherein the processor is further operative to stop the evaluation of the plurality of log likelihoods when one of the plurality of log likelihoods Gaussians is less than a lowest log likelihood of Gaussians of the sorted tree.

11. The apparatus of claim 8, wherein the processor, in evaluating the plurality of log likelihoods of Gaussians for a speech frame to calculate a partial distance by sequentially adding a plurality of dimensions, is operative to evaluate a plurality of log likelihoods of Gaussians for the speech frame.

12. The apparatus of claim 8, wherein the processor is further operative to stop the evaluation of the plurality of log likelihoods of Gaussians when one of the plurality of log likelihoods Gaussians is less than the bound.

13. The apparatus of claim 8, wherein the processor is further operative to:
   determine accumulated ranks for the plurality of dimensions; and
   sort the plurality of dimensions based on the accumulated ranks.

14. The apparatus of claim 8, wherein the threshold value is a positive number, and wherein comparing the plurality of log likelihoods of Gaussians comprises subtracting the positive number from the plurality of log likelihoods of Gaussians.

15. A computer-readable storage medium not consisting of a propagated data signal comprising computer executable instructions which, when executed on a computer, will cause the computer to perform a method of utilizing a posterior-based feature with partial distance elimination for speech recognition, the method comprising:
   receiving an utterance comprising a plurality of speech frames;
   determining accumulated ranks for a plurality of dimensions;
   sorting the plurality of dimensions based on the accumulated ranks; and
   evaluating a plurality of log likelihoods of Gaussians for a speech frame to calculate a partial distance by sequentially adding each of the plurality of dimensions according to the accumulated ranks, the partial distance elimination occurring when less than all of the plurality of dimensions are sequentially added;
   wherein the evaluating comprises maintaining a bound for the plurality of log likelihoods, the bound being determined by comparing the plurality of log likelihoods of Gaussians to a threshold value.

16. The computer-readable storage medium of claim 15, wherein evaluating a plurality of log likelihoods of Gaussians for a speech frame to calculate a partial distance by sequentially adding each of the plurality of dimensions according to the accumulated ranks further comprises maintaining the plurality of log likelihoods of Gaussians in a sorted tree.

17. The computer-readable storage medium of claim 16, further comprising stopping the evaluation of the plurality of log likelihoods of Gaussians when one of the plurality of log likelihoods of Gaussians is less than a lowest log likelihood of Gaussians of the sorted tree.

18. The computer-readable storage medium of claim 15, wherein evaluating the plurality of log likelihoods of Gaussians for a speech frame to calculate a partial distance by sequentially adding each of the plurality of dimensions according to the accumulated ranks comprises evaluating a plurality of log likelihoods of Gaussians for the speech frame.

19. The computer-readable storage medium of claim 15, further comprising stopping the evaluation of the plurality of log likelihoods of Gaussians when one of the plurality of log likelihoods of Gaussians is less than the bound.

20. The computer-readable storage medium of claim 15, wherein the threshold value is a positive number, and wherein comparing the plurality of log likelihoods of Gaussians comprises subtracting the positive number from the plurality of log likelihoods of Gaussians.

* * * * *